Sept. 24, 1935.  F. G. FOLBERTH ET AL  2,015,449
FLUID PRESSURE ACTUATED DEVICE
Filed Jan. 11, 1932   2 Sheets-Sheet 1

Inventors
FREDERICK G. FOLBERTH
& WILLIAM M. FOLBERTH

By Richey & Watts
Attorneys

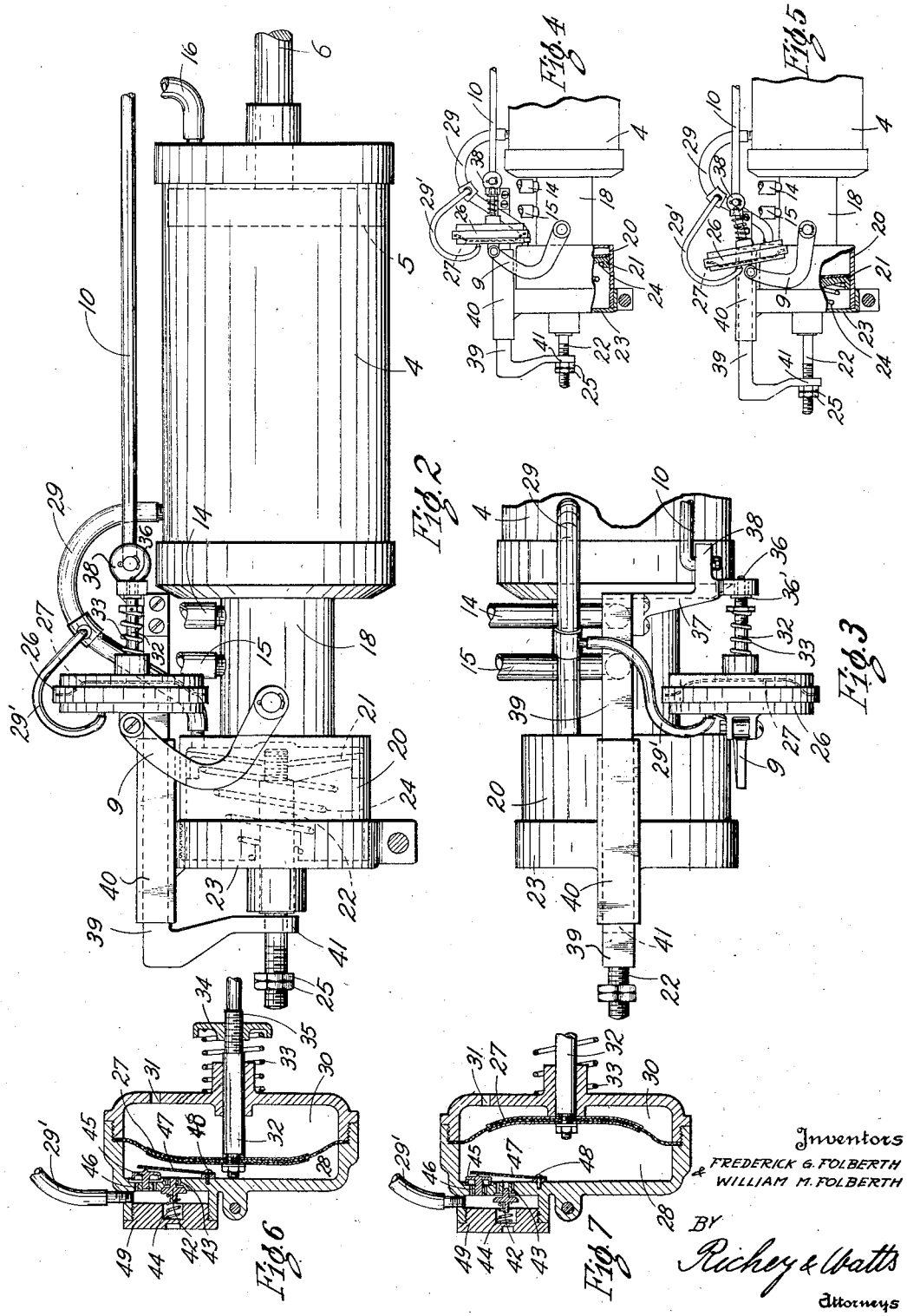

Patented Sept. 24, 1935

2,015,449

UNITED STATES PATENT OFFICE 2,015,449

FLUID PRESSURE ACTUATED DEVICE

Frederick G. Folberth and William M. Folberth, Cleveland, Ohio

Application January 11, 1932, Serial No. 585,818

14 Claims. (Cl. 192—13)

This invention relates to fluid pressure actuated apparatus and more particularly to means for controlling the operation of fluid pressure actuated vehicle brakes.

In our co-pending United States patent applications, Serial No. 561,569, filed September 8, 1931; Serial No. 483,328, filed September 20, 1930; and Serial No. 395,548, filed September 27, 1929, we have described and claimed certain improvements in fluid pressure actuated brakes for automobiles. The above noted co-pending applications relate to vacuum actuated means for applying the brakes of an automobile in which the source of vacuum or reduced pressure is preferably the intake manifold of the vehicle engine although a vacuum pump or the like may be utilized.

Our co-pending application, Serial No. 561,569, above referred to, relates to certain mechanism for taking up the slack in the vehicle brake system in preparation for the brake applying movement of the apparatus. The present invention embodies means for accomplishing this same purpose and also means adapted to offer the desired resistance to movement of the brake control valve.

In our co-pending applications we have disclosed and claimed fluid pressure actuated mechanism for operating vehicle brakes, which mechanism is provided with a valve adapted to be operated by movement of the vehicle clutch pedal. This valve is so connected that it is operated by the clutch pedal after said pedal has completed its clutch disengaging movement. In the operation of this type of apparatus it is desirable to cause the initial movement of the control valve to readily take up the slack in the brake mechanism. Another desirable feature is the provision of some means for imposing an additional resistance to the movement of the clutch pedal during the portion of its stroke in which the brake control valve is operated. One purpose of this is to give the operator of the vehicle a definite signal when he reaches the brake applying portion of the movement of the clutch pedal.

It is, therefore, among the objects of our invention to provide a simple and efficient apparatus which will control the initial slack removing movement of the brake mechanism and also serve to impose the desired resistance to movement of the control valve.

Another object of our invention is the provision of means for imposing resistance to the movement of the control valve in which the resistance imposed is proportionate to the actuating pressure within the operating cylinder. The last named object may perhaps be better expressed by stating that it is an object of our invention to provide means for increasing the resistance to movement of the control valve in proportion to the degree of application of the vehicle brakes. Further objects of the present invention are: the provision of means for indicating to the operator the degree of application of the vehicle brakes through the "feel" of the operating pedal; the provision of means for converting the force supplied by the operator in overcoming the imposed resistance into useful energy which helps apply the vehicle brakes, and the provision of an actuating pressure reservoir whereby ordinary variations in the engine speed and intake manifold suction will not interfere with the operation of our brakes.

The above and other objects of our invention will appear from the following description of a preferred embodiment thereof reference being had to the accompanying drawings, in which:

Fig. 2 is an enlarged view, partly in section, illustrating the operating cylinder, control valve, and our improved resistance imposing and slack removing mechanisms.

Fig. 3 is a plan view of the apparatus of Fig. 2.

Fig. 4 is a view similar to Fig. 2, on a reduced scale, illustrating the valve in slack removing position.

Fig. 5 is a view similar to Fig. 4, but illustrating the valve in brake applying position and the resistance mechanism in its corresponding situation.

Fig. 6 is a detached cross section of the diaphragm chamber illustrating a valve arrangement for controlling the action of the diaphragm, the valves being in position to permit free retracting movement of the diaphragm.

Fig. 7 is a view similar to Fig. 6, but showing the valves in position to connect the suction to actuate the diaphragm.

Figure 1:
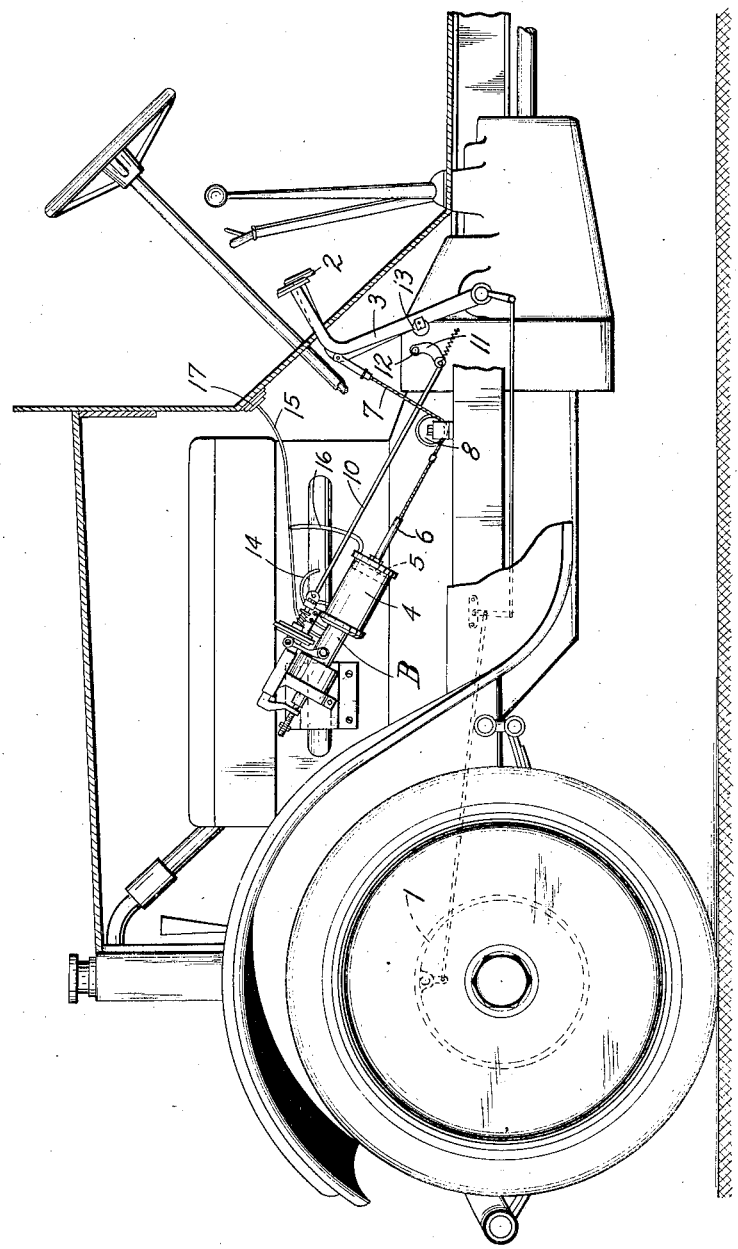
Fig. 1 is a side elevation, partly in section, of an automobile illustrating our improved fluid pressure brake control apparatus in position.

Referring now to Fig. 1, the vehicle brake 1 may be connected in the usual manner to be operated by the foot pedal 2. The clutch pedal 3 may also be connected in any suitable manner to operate the vehicle clutch. Our improved brake actuating apparatus is generally indicated at B and includes a cylinder 4 having a piston 5 therein. The piston rod 6 extends out through the lower end of the cylinder 4, and, as illustrated, is connected to the brake-operating pedal 2 by the cable connection 7. The cable 7 is guided by a pulley 8 in the installation illustrated, but it will be understood by those skilled in the art that any suitable connection may be employed to utilize the movement of the piston to apply the vehicle brakes. The main control valve, which controls the operation of the brake applying mechanism, is adapted to be actuated by the lever 9. This lever 9 is connected at its upper end to a rod 10, which in turn is connected at its lower end to the cam member 11 The cam 11 may be pivotally secured to any suitable rigid support, as at 12. A roller 13 is mounted on the clutch pedal or lever 3 and is adapted to engage the cam member 11.

The above described arrangement of the valve actuating apparatus is substantially the same as that illustrated in our co-pending United States patent application, Serial No. 561,569, filed September 8, 1931.

The parts are so arranged that when the operator pushes down on the clutch pedal 3 the first portion of its movement serves merely to disengage the clutch. After the clutch is disengaged, the roller 13 strikes the cam 11, and further downward movement of the clutch pedal then moves the rod 10 and the lever 9 to open the control valve, causing the piston 5 to move to apply the vehicle brakes.

The left hand end of the cylinder 4 is connected to the intake manifold of the engine through the conduit 14 and to the atmosphere through the conduit 15. The right hand end of the cylinder 4 is connected to the atmosphere through conduit 16, which joins conduit 15. The air which enters the system may be filtered by the provision of an air filter 17 at the intake end of the pipe 15.

The control valve which operates the brake mechanism is contained within the housing 18 and may be of any suitable type, preferably one which is adapted to cause a smoothly increasing braking action as the valve is opened by means of movement of the lever 9. This valve is not shown in detail as it may be of any suitable type and its details per se do not form a part of the present invention. Preferably this control valve should be of the well known self-lapping type of fluid pressure brake control valve in which the degree of application of the brakes of the vehicle is dependent upon the degree of movement imparted to the valve operating mechanism. Valves of the preferred type are adapted to give a smooth and even brake application and to permit a braking force to be applied in small increments and to maintain the brakes at any desired degree of application. A valve of the type referred to is shown and described in United States Patent No. 1,727,367 which issued on September 10, 1929 to J. M. J. Dormoy. A cylinder 20 is secured to the end of the valve casing 18 and contains a piston 21. The piston rod 22 is secured at one end to the piston 21 and its other end extends out through the end cap 23 of the cylinder 20. A spring 24, within the cylinder 20, tends to maintain the piston 21 in the right hand end of the cylinder 20 as shown in Fig. 2. The outer end of the piston rod 22 is threaded to take the adjusting nuts 25, whose function will be fully described later.

A diaphragm chamber or housing 26 is pivotally secured to the upper end of the valve operating lever 9. The diaphragm 27 lies within the chamber 26 and is adapted to divide it into two compartments. One of these compartments, which may be indicated by the reference numeral 28, is connected to the low pressure end of the cylinder 4 by means of the conduits 29' and 29. It will be noted that the conduit 29 connects the low pressure end of the cylinder 4 to the cylinder 20 on the side of the piston 21 away from piston rod 22. The other side of the diaphragm chamber 26 may be referred to by the numeral 30 and is connected to the atmosphere through a hole 31 in the diaphragm housing 26.

A rod 32 is secured to the diaphragm 27 and extends out through the end wall of the chamber 26. The spring 33, which surrounds the rod 32, abuts at one end against the housing 26 and at its other end against a flange nut 34 which has threaded engagement with the threaded portion 35 of the rod 32. This spring is normally under compression and tends to maintain the diaphragm in the position shown in Figs. 2, 3 and 7.

The end 36 of the rod 32 fits loosely in a hole in the bracket 37 to permit a certain degree of angular movement as shown in Fig. 5, and may be prevented from passing through the hole in the bracket 37 by means of a suitable flange 36'. The operating rod 10 is pivotally secured to the bracket 37 at 38. A bar 39, preferably of square cross section, has a sliding fit in the elongated bearing portion 40 of the end cap 23. The bracket 37 is secured to the inner end of the bar 39 by screws or other suitable means while its outer end is bent downwardly and provided with a forked or apertured end 41 which fits over the piston rod 22.

The operation of the above described apparatus is as follows:

When the operator of the vehicle pushes down on the pedal 3 its first movement disengages the clutch. After the disengaging action is complete, the rod 10 and the valve lever 9 are moved to open the control valve and connect the cylinder 4 to the suction of the intake manifold. The movement of the lever 9 will be effected through the bracket 37, the rod 32 and the diaphragm 27 and housing 26 which is pivoted to the end of the lever 9. The spring 33 is made of sufficient strength to transmit the initial movement of the rod 10 and the bracket 37 to the valve lever 9 without permitting the diaphragm 27 to be moved within the diaphragm chamber.

The initial opening movement of the main control valve causes a reduction in pressure within the cylinder 4 and, as the cylinder 4 is connected to the chamber 28 of the diaphragm housing 26 by the conduits 29 and 29', the pressure within the chamber 28 will be similarly reduced. This reduction in pressure will cause the diaphragm 27 to be moved to the left into the position shown in dotted lines in Fig. 4 and will withdraw the rod 32 a corresponding distance into the housing 26 and compress the spring 33. A suitable spring, not shown, may be incorporated in the main control valve mechanism within the housing 18 to normally maintain the lever 9 in its off position. Thus, when the diaphragm 27 is moved to the left by the suction of the manifold the effective length of the connection between the lever 9 and the bracket 37 will be shortened and, due to the spring just mentioned, the lever 9 will move in a closing direction and the parts will assume the position shown in Fig. 4.

Fig. 2 of the drawings illustrates the off positions of the parts when the operator's foot is removed from the pedal. Fig. 4 illustrates the positions of the parts after the operator has caused the initial opening of the main control valve and the diaphragm has acted to retract the valve lever 9 after its initial opening movement. The parts are preferably so proportioned that after the retracting movement takes place the main control valve will be opened to a point where it will maintain the vehicle brakes and brake connections in position with all the lost motion taken up and the brake bands about to contact with the brake drums. Any further downward movement of the pedal 3 will positively move the valve lever 9 to the left, opening the control valve, as the rod 10 is now directly connected thereto through the bracket 37 and the rod 32. The position of the rod 32 during this action is best seen in Fig. 6 in which the rod is illustrated as abutting the end wall of the diaphragm chamber to which the lever 9 is connected.

The function of the cylinder 20 and the piston 21 is to create an added resistance to movement of the pedal 3 during its brake controlling movement. In Fig. 2 it is seen that the end 41 of the bar 39 is out of contact with the adjustable stop nuts 25. However, after the initial movement of the main control valve has taken place and the diaphragm 27 has been moved to place the parts in position to secure immediate braking action, the end 41 of the bar 39 is preferably just contacting with the adjustable nuts 25 (Fig. 4). Any further movement of the rod 10 must then necessarily cause a corresponding movement of the piston 21 within the cylinder 20 and, as the cylinder 20 is connected to the cylinder 4 by the conduit 29, such movements will be resisted by the effect of the vacuum of the intake manifold. The position of the nuts 25 on the piston rod may be adjusted to bring the resistance of the piston 21 into action at the desired point in the brake applying movement of the pedal 3. As the suction within the cylinder 20 increases in proportion of the opening of the main control valve the resistance which will be offered to movement of the bar 39, and the valve operating lever 9, will increase with the degree of opening of the control valve. This is a desirable feature as it indicates to the vehicle operator the increase in braking effect which results from the successive steps of the brake applying movement of the pedal 3.

Fig. 5 illustrates the parts in the positions they assume during a brake applying action. It will be noted that the end 41 of the bar 39 has contacted with the nuts 25 and has moved the piston rod 22 and the piston 21 to the left against the suction within the cylinder 20.

The diaphragm chamber illustrated in Figs. 6 and 7 is the same as that shown in the other views of the drawings with the exception that valve means are provided for controlling the action of the diaphragm within the chamber. A valve closure member 42 is adapted to close the ports 43 in the end wall of the chamber 28. A spring 44 normally maintains the valve 42 in closed position. This valve 42 seats on the outer surface of the end wall of the chamber 28. A second valve 45 is adapted to close the ports 46 in the end wall of the chamber 28 and has its seat on the inner surface of the wall. This closure member 45 is adapted to be normally held against its seat by the elongated spring member 47 which may be secured at its inner end to the casing 26 by a screw 48. The spring 44 is held in position by the cover plug 49 and its strength is such that it holds the valve 42 against its seat until a certain vacuum, for example 5 pounds, is applied through the conduit 29'. When this vacuum reaches the predetermined figure the strength of the spring will be overcome and the valve 42 lifted from its seat. This permits air to be withdrawn from the chamber 28 and the diaphragm 27 to be moved into the position shown in Fig. 6.

Fig. 7 illustrates the valve 42 in open position and it may be considered that the diaphragm 27 is just starting to move to the left. It will be noted that when in this position the valve 45 is closed. When the main control valve in the housing 18 is closed the cylinder 4 is connected to the atmosphere and thus the conduit 29' will also be connected to the atmosphere through the conduit 29. When this connection is established the spring 44 will immediately close the valve 42 and the diaphragm 27 will be permitted to be moved freely to the right by the spring 33. Fig. 6 shows the valve 42 closed and the valve 45 open and it may be considered that in this view the diaphragm 28 is just starting to be moved to the right by the spring 33.

By the construction shown in Figs. 6 and 7 the diaphragm 27 will not move to retract the rod 32 until the main control valve has been opened an amount great enough to cause the predetermined vacuum to overcome the force of the spring 44 and open the vacuum connection to the diaphragm chamber.

From the above description of our invention it will be seen that we have provided a fluid pressure brake controlling mechanism in which the initial movement of the operating means will cause the lost motion in the brake linkage to be quickly taken up and the brake bands to be maintained in position just contacting with the brake drums. Thus the brakes are in position to be immediately applied upon further movement of the control valve and an exceedingly sensitive and effective braking action is obtained.

Although we have described the illustrated embodiments of our invention in some detail, it will be understood by those skilled in the art that modifications and variations thereof may be made without departing from the spirit of our invention. We do not, therefore, limit ourselves to the specific forms shown and described but claim as our invention all embodiments thereof coming within the scope of the appended claims.

We claim:

1. The combination with fluid pressure actuated brake mechanism having a control valve, of fluid pressure actuated means for imparting a closing movement to said valve after its initial opening movement and fluid pressure actuated means for resisting further opening movement of said valve.

2. In combination, a fluid pressure actuated brake, a valve for controlling the application of said brake, means for moving said valve in closing direction after it has been given an initial opening movement and fluid pressure controlled means for resisting further movement of said valve in brake applying direction.

3. In combination in an automotive vehicle, a fluid pressure actuated brake, a clutch, a valve for controlling the application of said fluid pressure actuated brake, operating connections between said clutch and said valve including a resilient member, fluid pressure actuated means for compressing said resilient member when said valve is initially opened and fluid pressure actuated means for resisting further movement of said operating connections in valve opening direction.

4. In combination in an automotive vehicle, a fluid pressure actuated brake, a valve for controlling the application of said brake, a clutch pedal, operating connections between said valve and said clutch pedal whereby movement of said clutch pedal operates said valve, and fluid pressure actuated means, controlled by said valve, for resisting movement of said valve and clutch pedal in brake applying direction.

5. In apparatus of the type described, a main cylinder, valve means for controlling the fluid connections to said cylinder, an operating lever for said valve means, a rod connected to said lever, a resilient member interposed in said rod, an auxiliary cylinder, an auxiliary piston in said auxiliary cylinder, fluid pressure conducting connections between said main and auxiliary cylinders, and lost motion connections between said rod and said auxiliary piston whereby the initial movement of said lever in valve opening direction will be free and subsequent movement of said lever in valve opening direction will be resisted by said auxiliary piston.

6. The combination with fluid pressure actuated mechanism having a cylinder and a control valve, of means for operating said control valve, fluid pressure actuated means for imparting a closing movement to said means for operating said control valve, said means being operated to impart such closing movement only upon a predetermined fluid pressure condition being reached within said cylinder.

7. The combination with fluid pressure actuated mechanism having a cylinder and a control valve, of fluid pressure actuated means for imparting a closing movement to said valve, a valve for controlling the actuating pressure connection to said means for imparting a closing movement to said control valve and spring means for maintaining said valve for controlling the actuating pressure connection to said means for imparting a closing movement to said control valve closed until a predetermined pressure has been reached.

8. In apparatus of the type described in combination, a cylinder having a piston therein, a source of supply of actuating pressure, connections between said cylinder and source of pressure, a valve for controlling the flow of fluid through said connections, fluid pressure actuated means for moving said valve in closing direction after initial opening movement, fluid conducting connections between said cylinder and said fluid pressure actuated means and spring loaded valve means for maintaining said last named connections closed until predetermined pressure conditions exist within said cylinder.

9. In apparatus of the type described in combination, a cylinder having a piston therein, a source of supply of actuating pressure, connections between said cylinder and source of pressure, a valve for controlling the flow of fluid through said connections, fluid pressure actuated means for moving said valve in closing direction after initial opening movement, fluid conducting connections between said cylinder and said fluid pressure actuated means and valve means for maintaining said last named connections closed until predetermined pressure conditions exist within said cylinder.

10. In combination in an automotive vehicle, a fluid pressure actuated brake, a valve for controlling the application of said fluid pressure actuated brake, valve operating means adapted to be actuated by the driver of the vehicle, said valve operating means including a resilient member, fluid pressure actuated means for changing the length of said resilient member when said valve is initially opened and fluid pressure actuated means for resisting further movement of said valve operating means in valve opening direction.

11. In apparatus of the class described, the combination with fluid pressure actuated brake operating means and a control valve for said brake operating means, of fluid pressure operated means for moving said control valve in closing direction after said valve has been given an initial opening movement, and fluid pressure actuated means, responsive to the effective fluid pressure in said brake operating means, for controlling the operation of said means for moving the control valve in closing direction.

12. In combination with a cylinder having a piston therein, a conduit connecting said cylinder to a source of actuating fluid pressure for causing movement of said piston in said cylinder, valve means for controlling the flow of actuating fluid through said conduit, a lever for operating said valve, a housing connected to said lever, said housing having a diaphragm chamber, a diaphragm in said diaphragm chamber, an actuating rod connected to said diaphragm, a conduit connecting said cylinder with said diaphragm chamber, and means, responsive to fluid pressure within said cylinder, for controlling the flow of actuating fluid through said last named conduit.

13. In combination, a housing, a diaphragm chamber in said housing, a diaphragm in said diaphragm chamber, a source of supply of actuating fluid pressure, a conduit adapted to connect said source of supply of fluid pressure to said diaphragm chamber on one side of said diaphragm and valve means, responsive to fluid pressure within said conduit, for controlling the flow of actuating fluid between said source of actuating fluid pressure and said diaphragm chamber.

14. In combination in an automotive vehicle, fluid pressure actuated brake operating mechanism, valve means for controlling said brake operating mechanism, an operating lever, operating connections between said operating lever and said valve means, said operating connections including a resilient member, fluid pressure actuated means for compressing said resilient member, and means, responsive to the effective fluid pressure in said brake operating mechanism, for controlling the operation of said means for compressing the resilient member.

FREDERICK G. FOLBERTH.
WILLIAM M. FOLBERTH.